United States Patent
Seedorf

(10) Patent No.: US 6,939,385 B2
(45) Date of Patent: Sep. 6, 2005

(54) FILTER DEVICE FOR FILTERING FLUIDS

(75) Inventor: Hans-Joachim Seedorf, Luneburg (DE)

(73) Assignee: Nordson Corporation, Westlake, OH (US)

(*) Notice: Subject to any disclaimer, the term of this patent is extended or adjusted under 35 U.S.C. 154(b) by 172 days.

(21) Appl. No.: 10/411,754

(22) Filed: Apr. 11, 2003

(65) Prior Publication Data

US 2003/0192292 A1 Oct. 16, 2003

(30) Foreign Application Priority Data

Apr. 12, 2002 (DE) .......................... 102 16 466

(51) Int. Cl.[7] .......................... B65D 8/04; B65D 41/06
(52) U.S. Cl. .......................... 55/498; 55/502; 55/503; 55/504; 55/385.3; 220/4.13; 220/293; 220/297; 220/300
(58) Field of Search .......................... 55/498, 502, 503, 55/504, 385.3; 220/4.13, 293, 297, 300

(56) References Cited

U.S. PATENT DOCUMENTS

| | | | | |
|---|---|---|---|---|
| 5,755,842 A | * | 5/1998 | Patel et al. .................... | 55/330 |
| 5,762,671 A | * | 6/1998 | Farrow et al. ................. | 55/496 |
| 5,800,581 A | * | 9/1998 | Gielink et al. ............. | 55/385.3 |
| 6,051,042 A | * | 4/2000 | Coulonvaux ................. | 55/498 |
| 6,334,887 B1 | * | 1/2002 | Coulonvaux ................. | 95/273 |
| 6,402,798 B1 | * | 6/2002 | Kallsen et al. ............. | 55/385.3 |

* cited by examiner

*Primary Examiner*—Duane Smith
*Assistant Examiner*—Minh-Chau T. Pham
(74) *Attorney, Agent, or Firm*—Wood, Herron & Evans, L.L.P.

(57) ABSTRACT

A filtering device for filtering fluids includes a filter housing, a filter element and an attaching device for attaching the filter element to the housing. The filter element is attachable to the filter housing using a bayonet lock.

9 Claims, 5 Drawing Sheets

FILTER DEVICE FOR FILTERING FLUIDS

FIELD OF INVENTION

The present invention relates to a filter device for filtering fluids, comprising a filter housing, a filter element and an attaching device for attaching the filter element to the housing. The present invention also relates to an application device having such a filter device.

BACKGROUND

Filter devices of the named type are known and are used in a large number of technical applications, especially in order to filter particles above a certain size out of a stream of liquid or gas. Filter devices of this sort are normally constructed in such a way that a filter element is removably attached to a housing using an attaching device. It is thus possible to release the filter element from the housing and remove it therefrom, in order to check it, clean it, replace it or the like.

In many applications, such removal of the filter element must be performed at short time intervals.

In the related art, attaching devices are known which provide such attachment and removal of the filter element by using locking screws or screw-mounted covers. Attachment of that type is complicated to release and causes long down times of the system or device with which the filter device operates, when the filter element is to be released from the housing or removed from it.

There is thus a need for an attaching device that allows simple and quick attachment and release of a filter element from a filter housing, which overcomes drawbacks of the prior art, such as those discussed above.

SUMMARY OF THE INVENTION

The present invention provides a device for attaching a filter element to a filter housing using a bayonet-type configuration. The manner of attachment according to the present invention achieves secure, positive-lock attachment of the filter element to the filter housing. The attachment may be releasable in a short amount of time by a simple motion, such as a small rotation. That reduces the time which is needed to release the filter element from the filter housing or to remove it therefrom. The filter device according to the present invention, when used in conjunction with a device which further processes the fluid being filtered, permits a short down time of the device when filter replacement or filter removal is necessary.

According to one aspect of the invention, the attaching device is movable between a closed position, in which the filter element is attached in a cavity of the filter housing and this cavity is sealed off from the surroundings, and an open position, in which the filter element may be removed from the filter housing. The cavity is connected with at least one fluid inlet and one fluid outlet. The filter element is positioned in the cavity in such a way that fluid which flows from the fluid inlet to the fluid outlet must pass through the filter element, and in so doing is filtered. The fluid to be filtered is normally under elevated pressure compared to the ambient pressure, but could also be at a lower pressure than the ambient pressure. In order to prevent fluid from escaping from the cavity into the surroundings, or environmental media, such as air, from entering the cavity from the surroundings, it is therefore necessary to seal the cavity off from the surroundings.

Advantageously, the attaching device may also be moved to a relief position located between the open and closed positions. In this relief position, the filter element is attached to the filter housing and the cavity is not sealed off from the surroundings. This embodiment is especially advantageous in order ensure safe removal of the filter element from the cavity. Since the fluid in the cavity is normally at a different pressure than the environment surrounding the filter device, as stated earlier, the resulting pressure difference may make removal of the filter element from the cavity more difficult and/or may lead to a risk of injury to the operating personnel of the filter device when performing the removal. It is conceivable, for example, that when the attaching device is moved from the closed to the open position, an overpressure in the cavity may cause parts of the attaching device to separate from the attaching device at high speed and injure the operator. It is also conceivable that the fluid which is under pressure may escape from the cavity at the moment the cavity is opened. Since health-endangering fluids or fluids at high temperature may be involved, uncontrolled escape of the fluid under high pressure is undesirable. It is also conceivable that the removal of the filter element or parts of the attaching device may be made more difficult by underpressure in the cavity. The relief position provided by the present invention makes it possible to reduce the pressure difference between the cavity and the surroundings in a controlled manner, without the filter element becoming detached from the housing prematurely.

According to another aspect of the invention, the attaching device is configured so that, in the relief position, all elements of the attaching device are secured to the filter housing, so that no elements of the attaching device can become separated from the housing prematurely. In the preferred embodiment, as described above, after the pressure difference between the cavity and the surroundings has been equalized for a certain length of time under controlled conditions in the relief position, the attaching device is moved to the open position and the filter element is then removed in a simple and safe manner.

Preferably, the attaching device is designed so that it may be moved between the open, closed, and relief positions by rotating a first attaching element around an axis of rotation. The axis of rotation may advantageously be parallel to the direction in which the filter element is removed from the filter housing or inserted into it, or may coincide with this direction. In order to achieve the various positions of the attaching element through rotation, means may be provided for applying torque to the first attaching element. For example, inside or outside hexagonal surfaces may be provided. In addition, there may be provision for an axial displacement of the attaching element in a direction parallel to the axis of rotation to be superimposed on the rotational movement around an axis of rotation, in order to move the attaching device between the positions.

The angle of rotation between the open and closed positions is preferably about 180°. A relief position, if provided, may be provided for example at a rotational angle of about 90°. This small rotational angle makes especially fast removal of the filter element and especially fast arrival at the relief position possible.

According to another aspect of the invention, the attaching device may be constructed in such a way that it includes a first attaching element having an elevation that interacts with a recess in a second attaching element. In this case one of the two attaching elements may be connected with the filter housing, or implemented as an attaching element connected with the filter housing in a single piece. The other attaching element is attachable through the interaction of the elevation with the recess on the forenamed attaching element. In this embodiment there may be provision, for example, for a first attaching element to have a surface on which an elevation is formed in a single piece. The elevation interacts with a recess in a surface of a second attaching element. The second attaching element is connected separably or in a single piece with the filter housing. The two attaching elements may be connected with each other through interaction of the elevation with the recess, so that the first attaching element may be removably attached to the filter housing.

In one exemplary embodiment, the first attaching element may be connected with the filter element in such a way that when the first attaching element is attached to the second attaching element or to the filter housing, the filter element is also attached to the filter housing. At the same time, the cavity in which the filter element is located my also be sealed from the surroundings, for example, by achieving a seal between the first and second attaching elements and between the second attaching element and the filter housing using elastic sealing elements.

In another exemplary embodiment, the elevation is formed on a surface of an attaching element which is connected removably or in a single piece with the filter housing, and the recess is formed in the surface of an attaching element, which may be removably attached to the forenamed attaching element.

Advantageously, the recess in the second attaching element includes an insertion section which extends in the direction of insertion from a reference surface lying perpendicular to the direction of insertion, a blocking section adjacent to the insertion section, which runs in a radial or radial-axial direction, and a closing section adjacent to the blocking section, which runs in a radial direction, the closing section extending further in the direction of the reference surface than the blocking section.

The reference surface here may be, for example, the surface in which the opening cross section of the recess in the second attaching element lies, through which the filter element is inserted into the cavity. In particular, the reference surface may be the outer surface of the second attaching element, which lies perpendicular to the direction in which the filter element is inserted into the cavity, or perpendicular to the axial direction in which a first attaching element that is attachable by a rotary movement is attached to a second attaching element.

The insertion section is constructed so that it may receive the elevation of the first attaching element and guide it in the direction of insertion. The closing section is arranged so that movement of the elevation of the first attaching element contrary to the axial direction of insertion is not possible, and the first attaching element is thus immovably fixed in this axial direction. The blocking section is designed so that it prevents the elevation from sliding into the insertion section without the application of force. Thus the blocking section can for example prevent the elevation from being able to be moved into the insertion section by a pure rotary movement, because the blocking section is designed so as to make a combined radial-axial motion necessary in order to move the elevation from the closing section into the insertion section.

In another exemplary embodiment, the recess includes an insertion section which extends in the direction of insertion from a reference surface lying perpendicular to the direction of insertion; a blocking section, adjacent to the insertion section, which runs in a radial or radial-axial direction; and a pressure relief section, adjacent to the blocking section, which runs in a radial direction. The pressure relief section extends further in the direction of the reference surface than the blocking section. The recess further includes a second blocking section, adjacent to the pressure relief section, which runs in a radial or radial-axial direction, and a locking section, adjacent to the second blocking section, which runs in a radial direction, the locking section extending further in the direction of the reference surface than the second blocking section.

With the aforementioned arrangement of the individual sections of the recess, it is possible to move the attaching device of the filter device according to the present invention from the closed position to a pressure relief position, in which case a blocking effect is achieved by the second blocking section, with the effect that both a radial (rotary) motion and an axial (shifting) motion are necessary for the movement from the closed to the pressure relief position. This prevents the attaching device from being moved to the pressure relief position unintentionally, or from moving to the pressure release position by itself, for example due to vibrations that occur during operation.

It is also possible to move the filter device according to the present invention from the pressure release position to the open position. In the same way as described earlier, when this is done a blocking effect is achieved by the first blocking section, with the result that a combined radial-axial motion, i.e. a superimposed rotary and shifting motion, is necessary in order to get from the pressure release position to the open position. This again prevents the attaching device from being moved unintentionally from the pressure release position to the open position, or from moving by itself due to forces that arise during operation. This also prevents unintentional movement of the attaching device further into the open position when it is being moved from the closed position to the pressure relief position. Such operation is particularly advantageous when the pressure relief stage is run through briefly or not at all.

The previously described embodiments having one or two blocking sections between the closed/pressure release and open positions are especially advantageous, when an elastic element is provided at the same time which exerts a force operating in an axial direction on one of the attaching elements. This force is advantageously oriented so that it acts contrary to the axial direction of movement which is necessary to overcome a blocking section lying between two positions. This accomplishes further securing of the attaching device in one of the two or three possible positions. A simple exemplary embodiment having such an elastic element may, for example, contain a pressure spring which is positioned in the cavity that receives the filter element, and which is pre-tensioned so that it is directed against a first attaching element contrary to its direction of insertion into the cavity, this first attaching element working together with a second attaching element that is attached to the housing containing the cavity.

In another exemplary embodiment, the first attaching element has a cylindrical surface on which the elevation is formed in a single piece, and which is arranged around the insertion direction in rotational symmetry. According to this embodiment, especially simple production of the attaching device is possible. The cavity that receives the filter element is implemented advantageously as a borehole open to one side (blind hole). The direction of insertion of the first attaching element is then directed from the opening of the cavity in the direction of the bottom of its hole. As explained earlier, this embodiment advantageously provides for a pressure spring to be positioned in the cavity, which exerts a pressure on the first attaching element that is directed contrary to the direction of insertion. The pressure spring may be braced for example against the floor of the cavity, or it may be braced against a projection formed in the cavity.

The elevation may be designed, for example, as a cylindrical pin, which extends in a radial direction and protrudes beyond the cylindrical surface of the first attaching element. In this case the cross sectional area of the pin must be matched to the loads which occur in operation. These loads are due to the pressures which arise in the cavity due to operation, and to the spring force which is exerted on the first attaching element by a pressure spring which may be provided in the cavity. The design of the elevation may depart from a round cross sectional area, especially if these forces are great, and oval or rectangular cross section geometries, or cross section geometries that extend in the radial or axial direction in some other way, may be provided in order to prevent bending, shearing or other failure of the elevation, and consequently of the attaching device, due to the operating forces.

In addition, the second attaching element in the embodiments described above may designed advantageously as a cover plate which is removably connected with the housing, and in which a plurality of sections are formed. The sections may in particular represent the sections designated in claims 7 and 8 in the form of a plurality of steps. The sections may also be incorporated into the cover plate in the form of indentations. Furthermore, the side of the cover plate facing the housing may have stepped recesses, which form indentations when the cover plate is attached to the housing, which indentations are limited in the axial direction on both sides, namely on one side by a surface of the housing and on the other side by a surface of the cover plate.

An additional aspect of the present invention is an application device for delivery of fluids, which includes at least one filter device in one of the embodiments described earlier.

Such application devices normally include a supply channel which is connectable to a source of fluid, a valve system which is movable between an open and a closed position, and a nozzle system. The filter device according to the present invention may be positioned functionally here between the supply channel and the valve system. It is also conceivable to place the filter device between the valve system and the nozzle. It is also customary to provide a plurality of valve and nozzle systems, which are supplied in common from one source of fluid. Provision may be made here, for example for economic reasons, for only one filter device, which effects filtration of the fluid which is supplied to the plurality of valve systems.

BRIEF DESCRIPTION OF THE DRAWINGS

An exemplary embodiment of the present invention will be described on the basis of the figures. The figures show the following.

DETAILED DESCRIPTION

Figure 1:
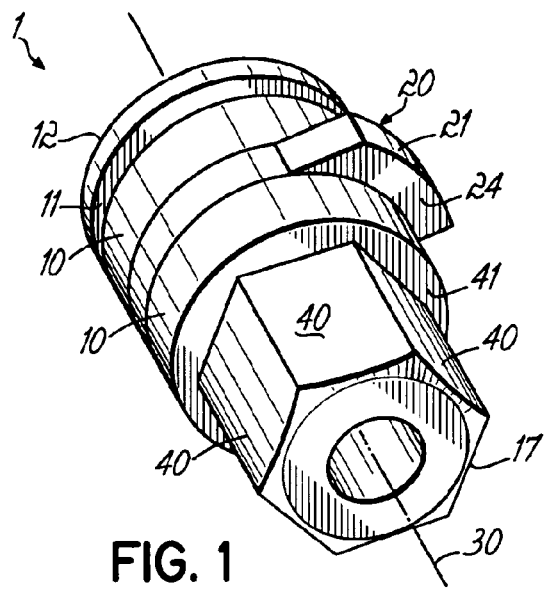
FIG. 1: A perspective view of a first attaching element of an attaching device of the filter device according to the present invention.

Referring to FIG. 1, a first attaching element 1 of an exemplary attaching device of the filter device according to the present invention has a cylindrical surface 10, on which an elevation 20 is formed. Cylindrical surface 10 is arranged in rotational symmetry around an axis 30. Elevation 20 extends in a radial direction from axis 30. In addition, there are hexagonal surfaces 40 formed around rotational axis 30 of the first attaching element 1, to facilitate engagement of first attaching element 1 with a tool, for example, to permit applying a torque to the first attaching element 1.

Figure 2:
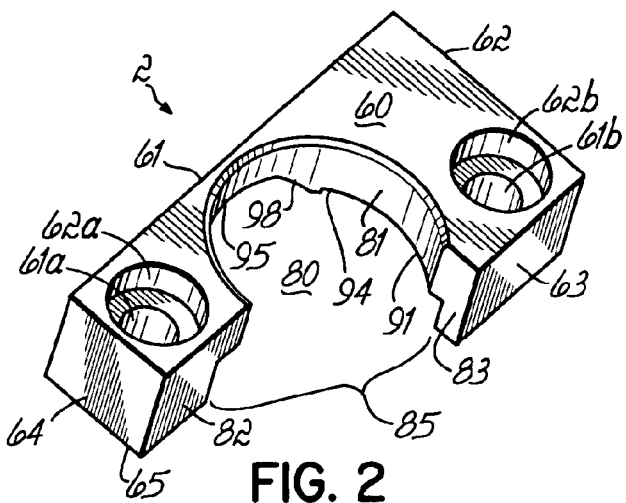
FIG. 2: A perspective view of the top of a second attaching element of the attaching device of the filter device according to the present invention.
Figure 3:
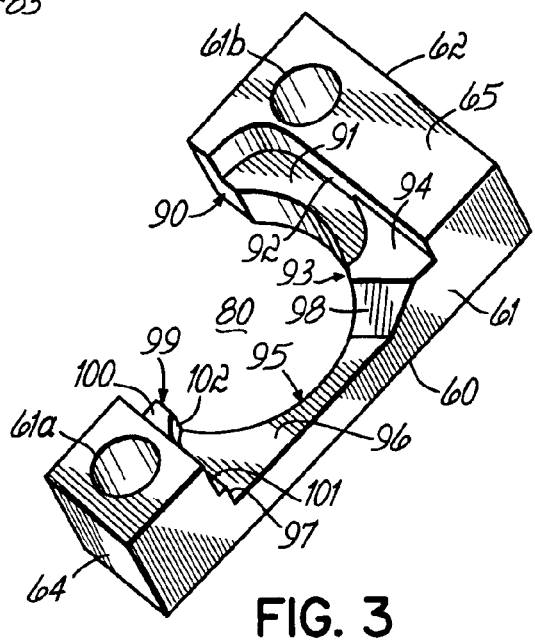
FIG. 3: A perspective bottom view of the attaching element of FIG. 2.
Figure 4:
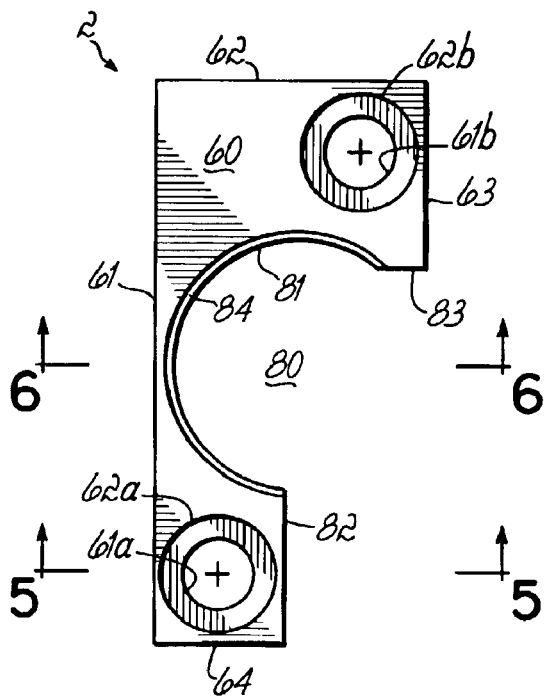
FIG. 4: A top view of the attaching element of FIG. 2.

Referring to FIGS. 2–9, a second attaching element of the attaching device of the filter device according to the present invention, constructed as a cover plate 2, has an outer surface 60 to which there two boreholes 61a, 61b in perpendicular orientation. Boreholes 61a, 61b have cylindrical counter-bores 62a, 62b, so that conventional commercial socket-head cap screws may be inserted through boreholes 61a, 61b and screwed down, after which the screw head is countersunk into the second attaching element in such a way that it does not protrude beyond the outer surface 60. The second attaching element is constructed as a cover plate 2, which is made from a rectangular starting piece. Centered in the middle of outer surface 60 there is a through borehole 80 which extends to a lower surface 65 of the cover plate (FIG. 3). Borehole 80 has a cylindrically shaped surface 81 extending over a reference circle, which corresponds to cylindrical surface 10 of the first attaching element 1. The diameter of surface 81 is slightly greater than the diameter of cylindrical surface 10, so that it is possible to shift and twist the first attaching element 1 easily when the latter is inserted into borehole 80 of the second attaching element 1. In the exemplary embodiment shown, cylindrical borehole 80 has a radial opening 85 open over a circumferential angle of about 120° in a radial direction, since a corner area of the rectangular starting piece from which the second attaching element is made is removed. The cover plate 2 therefore has an approximately L-shaped form in the top view, as may be recognized clearly in FIG. 4.

Referring to FIG. 1, elevation 20 extends over a circumferential angle which is smaller than the circumferential angle of the opening of borehole 80. This makes it possible to insert the first attaching element into borehole 80 in the axial direction, with elevation 20 projecting into the radial opening 85 of borehole 80.

Referring again to FIGS. 2–9, cover plate 2 has a first lateral surface 61 that extends over the entire length of cover plate 2, and a first face 62 that extends over the entire width of cover plate 2. Opposite first lateral surface 61, a second lateral surface 63 is formed, which lies parallel to first lateral surface 61. Second lateral surface 63 extends from a corner, at which it abuts on first face 62, in the direction of the radial opening 85 of borehole 80, and is interrupted by the latter, causing it to not extend over the entire length of cover plate 2. Located parallel to first face 62 is a second face 64, which extends from a corner, at which it abuts on first lateral surface 61, in the direction of the radial opening 85 of borehole 80. Second face 64 therefore does not extend over the entire width of cover plate 2. The radial opening 85 of borehole 80 is limited by an opening lateral surface 82 positioned parallel to first lateral surface 61, and by an opening face 83 positioned parallel to first face 62. Opening lateral surface 82 extends from a corner, at which it abuts on second face 64, approximately in the direction of the center point of borehole 80. Opening face 83 extends from a corner, at which it abuts on second lateral face 63, in the direction of borehole 80.

Referring to FIG. 3, cover plate 2 has a lower surface 65, through which boreholes 61a, 61b extend. Lower surface 65 has a plurality of recesses 90, 93, 95, 99 in the area around borehole 80, which extend from lower surface 65 in the direction of outer surface 60 and are open toward borehole 80. Extending in the area between the center point of borehole 80 and first face 62 is a closing recess 90, which is limited by a surface 91 positioned parallel to outer surface 60 and by a surface 92 positioned parallel to first face 62. Closing recess 90 extends in a direction parallel to first face 62, far enough that it is able to receive elevation 20. That is, closing recess 90, in particular surface 91 of recess 90, extends over a circumferential angle that corresponds at least to the circumferential angle over which elevation 20 of the first attaching element 1 extends. When the first attaching element 1 is inserted into borehole 80, and elevation 20 of the first attaching element 1 engages closing recess 90 of cover plate 2, the attaching device of the filter device according to the present invention is in the closed position.

With continued reference to FIGS. 2–3, extending adjacent to closing recess 90 is a first blocking recess 93, which is also open in the direction of the center point of the borehole 80 and in the direction of lower surface 65 of cover plate 2. First blocking recess 93 is limited by a surface 94 positioned parallel to outer surface 60, and by surface 92 positioned parallel to face 62.

Surface 94 of first blocking recess 93 is at a greater distance from outer surface 60 than surface 91 of locking recess 90. To get from the closed position in closing recess 90 through the blocking position of first blocking recess 93, the first attaching element must therefore be pressed further in the axial direction toward lower surface 65, and at the same time be turned counterclockwise, with respect to FIG. 2, for example using hexagonal surfaces 40.

Adjacent to first blocking recess 93 is a relief recess 95, which is limited by a surface 96 positioned parallel to outer surface 60 and by a surface 97 positioned parallel to second face 64. Surface 96 of relief recess 95 is connected with surface 94 of blocking 93 via an oblique surface 98. Relief recess 95 extends over a circumferential angle which is greater than the circumferential angle over which elevation 20 of the first attaching element 1 extends. Relief recess 95 is therefore able to receive elevation 20 in its entirety. Surface 96 of relief recess 95 is positioned closer to outer surface 60 than surfaces 91 and 94 of locking recess 90 or blocking recess 93. Oblique surface 98 is therefore oriented obliquely in the direction of outer surface 60, starting from surface 94 of blocking recess 93.

Elevation 20 of the first attaching element is moved from the blocking position in blocking recess 93 to the relief position in relief recess 95 by a rotational motion in the counterclockwise direction, with respect to FIG. 2, and simultaneous axial motion directed from lower surface 65 toward outer surface 60.

Adjacent to relief recess 95 is a second blocking recess 99, which is limited by a surface 100 positioned parallel to outer surface 60 and by a surface 101 positioned parallel to second face 64. Surface 100 of second blocking recess 99 is at a greater distance from outer surface 60 than surface 96 of relief recess 95. Surface 100 is connected with surface 96 via a curved surface 102, which is oriented perpendicular to outer surface 60.

Elevation 20 of first attaching element is moved from relief recess 95 into blocking recess 99 by an axial motion in the direction from outer surface 60 toward lower surface 65, and a subsequent rotational motion in the counterclockwise direction of FIG. 2. Through an additional motion in the counterclockwise direction of FIG. 2, recess 20 is rotated into the radial opening 85 of borehole 80. Since this radial opening 85 receives elevation 20 completely, the first attaching element 1 may accordingly be removed from cover plate 2 through an axial motion in the direction from lower surface 65 toward upper surface 60.

Figure 5:
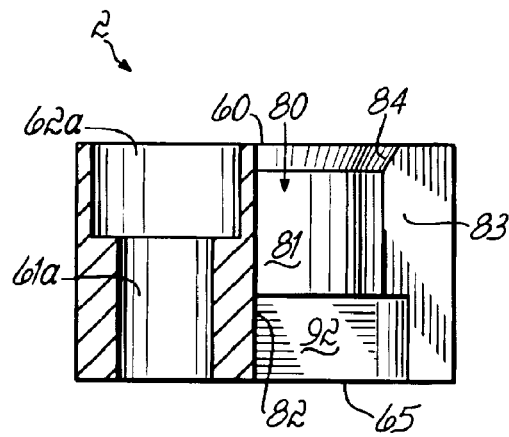
FIG. 5: A sectional front view at cutting line A—A of FIG. 4.
Figure 6:
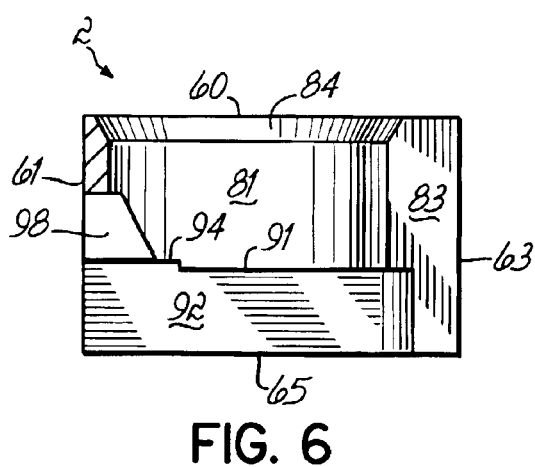
FIG. 6: A sectional front view of the attaching element of FIG. 2 at cutting line D—D of FIG. 4.
Figure 7:
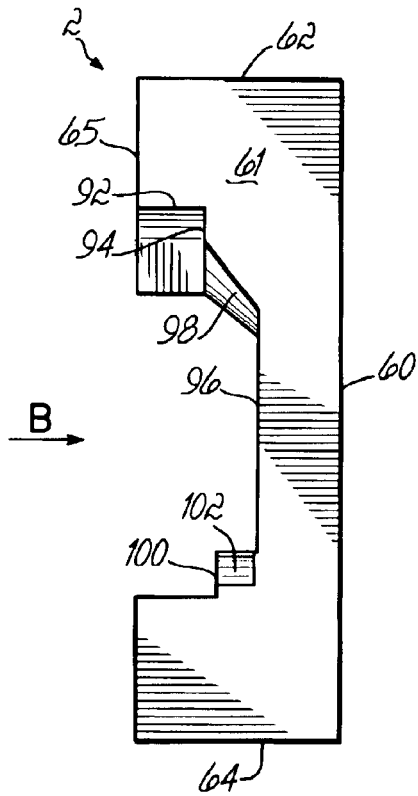
FIG. 7: A side view of the attaching element of FIG. 4.
Figure 8:
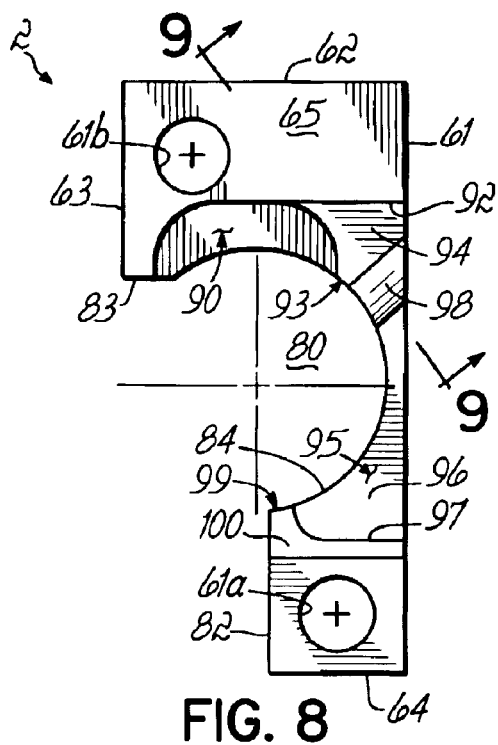
FIG. 8: A bottom view of the attaching element of FIG. 2.
Figure 9:
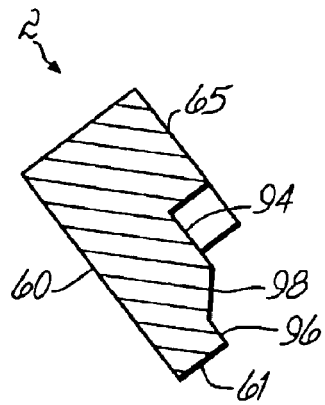
FIG. 9: A sectional oblique view of the attaching element of FIG. 2 at cutting line C—C in FIG. 8.
Figure 10:
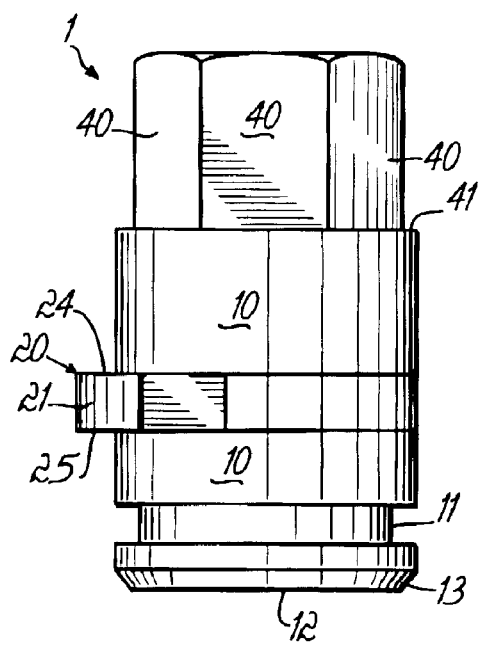
FIG. 10: A front view of the attaching element of FIG. 1.
Figure 11:
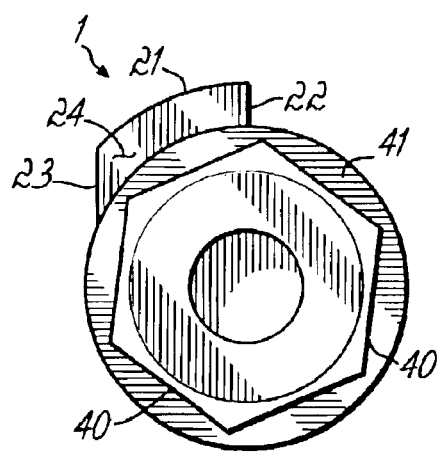
FIG. 11: A top view of the attaching element of FIG. 1.
Figure 12:
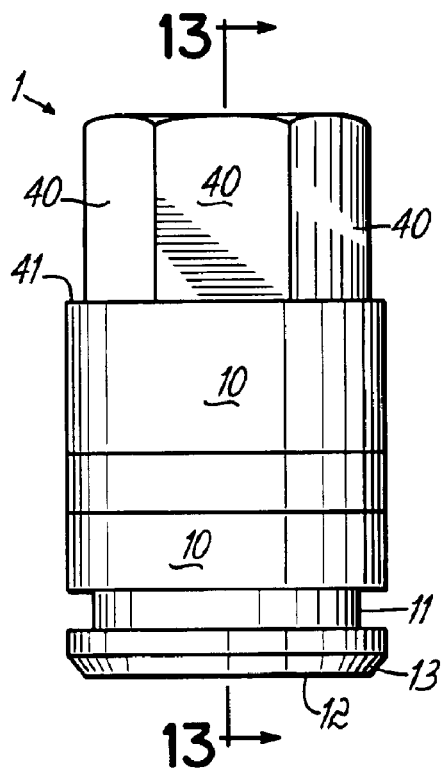
FIG. 12: A side view of the attaching element of FIG. 1.

Referring to FIG. 5, cylindrical surface 81 of borehole 80 is connected with outer surface 60 via a conical surface 84. This makes it easier to insert the first attaching element 1 into borehole 80.

Referring to FIGS. 10–13, the first attaching element 1 has hexagonal surfaces 40 which are positioned around center axis 30 at angles of approximately 60° to each other. Hexagonal surfaces 40 are designed so that torque may be exerted on the first attaching element using a conventional tool (not shown), such as an open end wrench, a box wrench or a socket wrench.

Adjacent to hexagonal surfaces 40 in the axial direction is a cylindrical lateral surface 10 from which elevation 20 protrudes in a radial direction. Elevation 20 extends over an angle of about 90°. It is limited by an outer circumferential surface 21, a first contact surface 22 lying radially with respect to lateral surface 10 and a second contact surface 23 lying tangential to lateral surface 10, and two opposing surfaces 24, 25 that face in the axial direction. The surfaces 24, 25 facing in the axial direction have the shape of a ring section. Elevation 20 is located between the two axial ends of the first attaching element 1, and is at a greater distance from the first axial end 17 on which hexagonal surfaces 40 are formed than from the opposite, second axial end 12.

In the area of the second axial end 12 of the first attaching element 1, a ring groove 11 having a rectangular cross section is incorporated into lateral surface 10. The function of ring groove 11 is to receive a sealing element.

The second axial end 12 of the first attaching element 1 has a 45° chamfer 13. Chamfer 13 makes it easier to insert the first attaching element into borehole 80. Chamfer 13 works together with conical surface 84 to facilitate insertion of the first attaching element 1 into borehole 80. The first attaching element 1 is inserted with its second end 12 in front into borehole 80, from outer surface 60 in the direction of lower surface 65.

Figure 13:
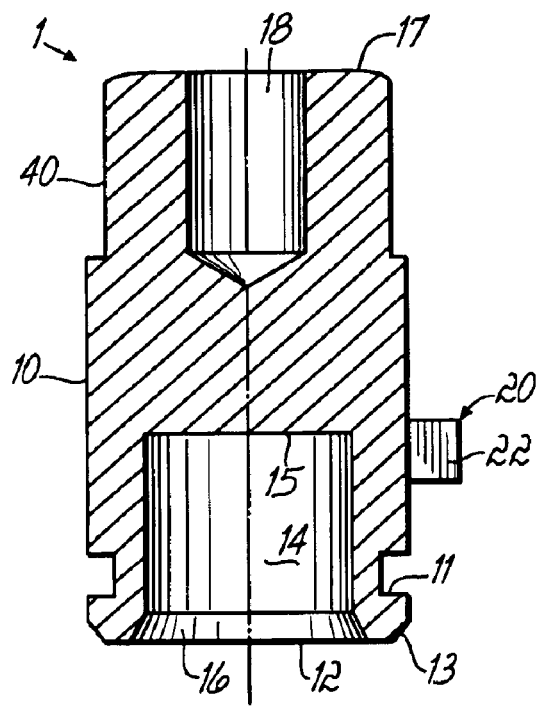
FIG. 13: A sectional front view of the attaching element of FIG. 1 at cutting line A—A in FIG. 12.

Referring in particular to FIG. 13, a cylindrical borehole 14 extends in the axial direction from the second axial end 12 of the first attaching element 1. Borehole 14 is formed as a blind bore, and has a floor surface 15 at its end opposite the second end 12. Borehole 14 has a countersink 16 in the area of its opening. The function of borehole 14 is to receive a pressure spring. At the first axial end 17, having hexagonal surfaces 40, there is likewise a blind bore 18 extending in the axial direction, which may be used, for example, to guide a tool.

Figure 14:
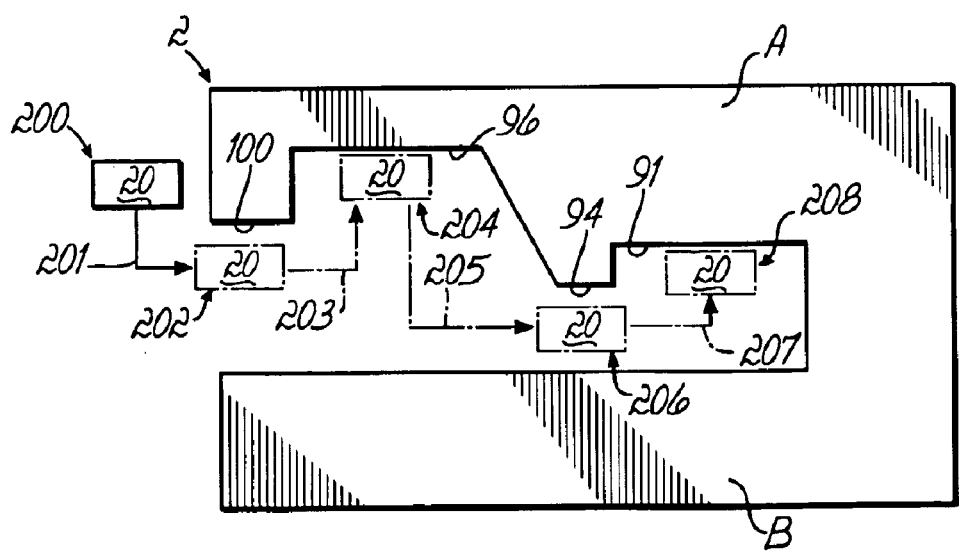
FIG. 14: A schematic execution of the attaching element of FIG. 2.

Referring to FIG. 14, cover plate 2 is shown schematically by a segment A which has surfaces 91, 94, 98, 96 and 100 of recesses 90, 93, 95 and 99 on its underside. Opposite segment A is a segment B, which is represented for example by the housing to which the adapter plate is attached. Elevation 20 (shown schematically in FIG. 14), is movable from an open position 200 to first blocking position 202 by means of an axial-radial motion 201. From first blocking position 202, elevation 20 is movable to a relief position 204 by means of a radial-axial motion 203, the axial component of motion 203 being contrary to the direction of the axial component of motion 201. From this relief position 204, elevation 20 is again movable to a second blocking position 206 by an axial-radial motion 205. The axial motion direction of motion 205 is contrary to the axial motion direction of motion 203, and thus in the same direction as the axial motion direction of motion 201. From the second blocking position 206, elevation 20 is movable to a closed position 208 by means of a radial-axial motion 207. The axial motion direction of motion 207 is contrary to the axial motion direction of motion 205. From the closed position 208, elevation 20 is again movable by means of motions of correspondingly opposite direction to second blocking position 206, relief position 204, first blocking position 202 and open position 200.

Figure 15:
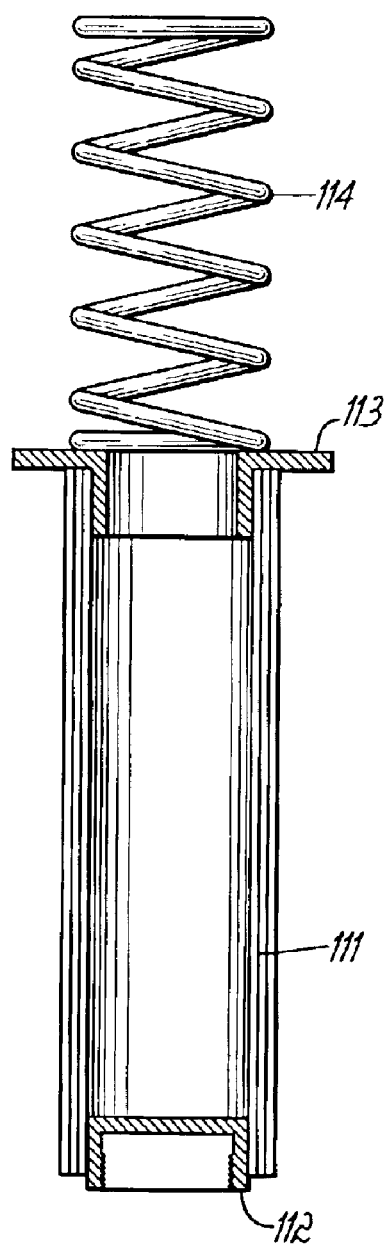
FIG. 15: A partial sectional front view of the filter element with spring element.
Figure 16:
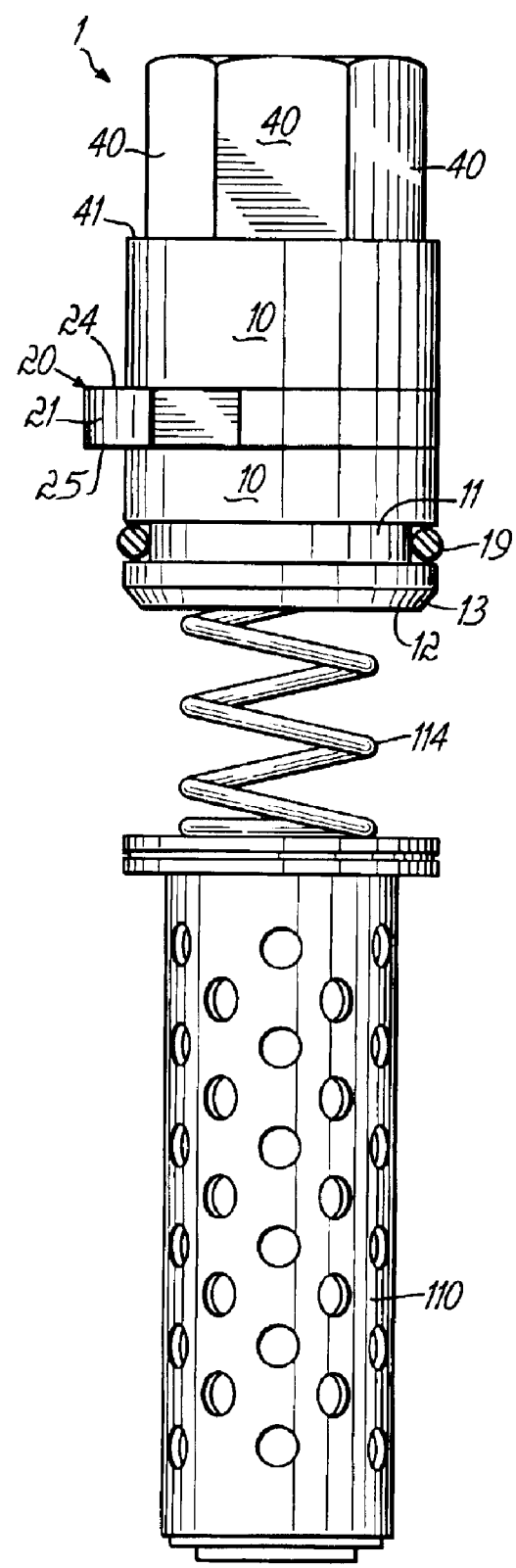
FIG. 16: A front view of the filter element with spring element and one attaching element.

Referring to FIG. 15 and FIG. 16, there is an O-ring seal 19 positioned in rectangular-cross-sectioned ring groove 11 of the first attaching element 1. O-ring seal 19 projects slightly beyond lateral surface 10 of the first attaching element 1, and is thus able to provide a seal against cylindrical surface 81 of borehole 80 and a cylindrical surface formed coaxially to that cylindrical surface 81, which is formed in a cavity of the housing (not shown) to which the second attaching element is attached by screws inserted through boreholes 61a, 61b. In the forenamed cavity there is a filter element 110, which may be made, for example, from a cylindrical screen 111. Filter element 110 has bracing elements 112, 113 at its two axial ends. Bracing element 112 braces the filter element against the floor of the cavity. Bracing element 113 acts against a pressure spring 114, and is irremovably connected thereto, for example, by welding. Pressure spring 114 is inserted into borehole 14 of the first attaching element 1, and is braced against the floor surface 15 of that borehole, as depicted in FIG. 16. Pressure spring 114 exerts a pressure on the first attaching element 1, which acts upon it contrary to the direction of insertion, which is directed from outer surface 60 in the axial direction toward lower surface 65. When filter element 110 is received in the housing cavity and the first and second attaching elements 1, 2 are engaged, with elevation 20 in the closed position, elevation 20 is biased by spring 114 against cover plate 2, with its ring section surface 24, which faces the hexagonal surfaces 40, against surfaces 91, 94, 98, 96 and 100 of sections 90, 93, 95 and 99. As a result of the bias force created by spring 114, elevation 20 is not able to move inadvertently from the closed position to the relief position, since this requires a motion contrary to the bias force in order to raise elevation 20 over surface 94 of blocking recess 93. In the same way, the bias force prevents elevation 20 from being rotated inadvertently from the relief position to the open position, since this requires a motion contrary to the bias force in order to raise elevation 20 over surface 100 of second blocking section 99.

In order to be able to execute the forenamed axial motion directions or to apply the force that overcomes the force of the pressure spring, at the transition from hexagonal surface 40 to lateral surface 10 there is an axial ring surface 41 against which a tool applied to hexagonal surfaces 40 may be braced, so that a force can be exerted through this tool against the spring force of spring 114.

I claim:

1. A filtering system, comprising:
    a filter housing having a cavity for receiving a filter element;
    a filter element;
    a bayonet lock rotatable relative to said filter housing, moveable in an axial direction and configured to permit rapid securing of said filter element within, and removal of said filter element from, said cavity of said filter housing, said bayonet lock rotatable between a closed position at a first axial position wherein said filter element is coupled to said filter housing an sealed within said cavity, an open position wherein said filter element is removable from said filter housing, and a relief position at a second axial position different than said first axial position and intermediate said open and closed positions wherein said filter element is coupled to said filter housing and disposed within said cavity in a non-sealed condition; and
    a spring biased against said bayonet lock to prevent inadvertent movement of said bayonet lock between said open, closed and relief positions.

2. The filtering system of claim 1 wherein said bayonet lock comprises an attaching element having an axis of rotation, said bayonet lock movable between said open position, said relief position, and said closed position by rotating said attaching element bout said axis of rotation.

3. The filtering system of claim 2, wherein said attaching element rotates through an angle of approximately 180 degrees between said open position and said closed position.

4. The filtering system of claim 1, wherein said bayonet lock comprises:
    a first attaching element having an elevation; and
    a second attaching element having a recess;
    said elevation on said first attaching element engageable with said recess on said second attaching element to facilitate securing said filter element within said cavity and removing said filter element from said cavity.

5. The filtering system of claim 4, wherein:
    said second attaching element further comprises a reference surface oriented perpendicular to a direct along which said elevation is engaged with said recess; and
    said recess comprises:
        an insertion section extending from said reference surface, generally in a direction along which said elevation engages said recess,
        a blocking section adjacent said insertion section and extending in a radial or radial-axial direction, and
        a closing section adjacent said blocking section and extending in a radial direction, said closing section extending further in the direction of said reference surface than said blocking section.

6. The filtering system of claim 4 wherein:
    said second attaching element further comprises a reference surface oriented perpendicular to a direction along which said elevation is engaged with said recess; and said recess comprises:
- an insertion section extending from said reference surface, generally in a direction along which said elevation engages said recess,
- a first blocking section adjacent said insertion section and extending in a radial or radial-axial direction,
- a pressure relief section adjacent said first blocking section and extending in a radial direction, said pressure relief section extending further toward said reference surface than said first blocking section,
- a second blocking section adjacent said pressure relief section and extending in a radial or radial-axial direction, and
- a locking section adjacent said second blocking section and extending in a radial direction, said locking section extending further toward said reference surface than said second blocking section.

7. The filtering system of claim 4, wherein said spring is configured to bias said first attaching element in a direction toward said second attaching element to thereby inhibit movement of said first attaching element relative to said second attaching element when said elevation is engaged in said recess.

8. The filtering system of claim 4, wherein said first attaching element has a generally cylindric shape and said elevation comprises a lobe extending radially outward from a surface of said cylindrical shape.

9. The filtering system of claim 4, wherein said second attaching element comprises a plate couplable to said filter housing adjacent said cavity.

* * * * *

UNITED STATES PATENT AND TRADEMARK OFFICE
CERTIFICATE OF CORRECTION

PATENT NO. : 6,939,385 B2
DATED : September 6, 2005
INVENTOR(S) : Hans-Joachim Seedorf It is certified that error appears in the above-identified patent and that said Letters Patent is hereby corrected as shown below:

Column 10,
Line 23, change "an" to -- and --.
Line 38, change "bout" to -- about --.
Line 52, change "direct" to -- direction --.

Signed and Sealed this

Twenty-seventh Day of December, 2005

JON W. DUDAS
*Director of the United States Patent and Trademark Office*